United States Patent [19]
Cheng et al.

[11] Patent Number: 6,143,884
[45] Date of Patent: Nov. 7, 2000

[54] MANUFACTURING PROCESS OF CELLULOSE VISCOSE WITH LOW VISCOSITY

[75] Inventors: Meng-Song Cheng, Chaung Hua; S. P. Chen, Taichung; K. C. Lai, Chaung Hua, all of Taiwan

[73] Assignee: Acelon Chemicals & Fiber Corporation, Chaung Hua, Taiwan

[21] Appl. No.: 09/075,006

[22] Filed: May 9, 1998

[51] Int. Cl.⁷ .............................. D21C 3/20; D21H 17/07; C08B 37/00
[52] U.S. Cl. ................................. 536/56; 162/81; 536/124
[58] Field of Search .............................. 536/56, 57, 124, 536/80, 88; 162/81

[56] References Cited

U.S. PATENT DOCUMENTS

| | | | |
|---|---|---|---|
| 4,144,080 | 3/1979 | McCorsley, III | 106/186 |
| 4,211,574 | 7/1980 | McCorsley, III et al. | 106/183 R |
| 5,362,867 | 11/1994 | Chin et al. | 536/57 |
| 5,540,874 | 7/1996 | Yamada et al. | 264/187 |
| 5,618,483 | 4/1997 | Weigel et al. | 264/187 |

FOREIGN PATENT DOCUMENTS 20608  8/1981  Hungary .

OTHER PUBLICATIONS

Berger et al., *Acta Polymerica,* vol. 40 (5) :351–358, 1989.
Kabrelian et al., *Acta Polymerica,* vol. 39 (12) : 710–714, 1988.
Berger et al., *Acta Polymerica,* vol. 41 (1) :25–31, 1990.

*Primary Examiner*—Howard C. Lee
*Attorney, Agent, or Firm*—David & Raymond; Raymond Y. Chan

[57] ABSTRACT

A manufacturing process of cellulose solution with low viscosity includes the step of dissolving a cellulose in a mixture solvent which is produced by mixing an additional solvent mixture, N-methylol caprolactom, with a main solvent, N-methyl morpholine oxide. The present invention not only can increase the swelling of the pulp during the dissolving process, but also can lower the viscosity of the cellulose solution that enables the manufacturing process to process at lower temperature and the cellulose solution produced to spin in higher spinning speed. Therefore, the physical property and the quality of the final fiber product are improved by eliminating the problem of cellulose polymerization decay.

12 Claims, 1 Drawing Sheet

MANUFACTURING PROCESS OF CELLULOSE VISCOSE WITH LOW VISCOSITY

FIELD OF THE PRESENT INVENTION

The present invention relates to a cellulose solvent adapted for manufacturing a cellulose solution with low viscosity, wherein the cellulose solvent is a mixture solvent containing a main solvent, N-Methyl Morpholine Oxide, and an additional solvent, N-methylolcaprolactam, for improving the physical property of the cellulose solvent so as to produce the cellulose solution with low viscosity.

BACKGROUND OF THE PRESENT INVENTION

The most commonly known conventional manufacturing process of the cellulose fiber is a viscose process. However, the popularity of such viscose process is gradually declined due to the fact that the viscose process has too many processing steps and produces carbon disulfide $CS_2$ and sulfur dioxide $SO_2$ that will cause serious environment pollution during the production process.

Recently, a new non-polluting manufacturing process called cellulose solvent spin process (also known as solvent process) has been used to mass-produce the cellulose fiber. The advantages of the cellulose solvent spin process include that:

(1) it will not produce pollution during the production process;

(2) it has a simple and relatively short process;

(3) it is excellent for mass production;

(4) it has a low manufacturing costs;

(5) it can produce high quality final product.

However, the cellulose solvent spin process also has a critical shortcoming, that is the viscosity of the cellulose solution produced is as high as 12000 poise to 30000 poise. It is well known that the cellulose solution with high viscosity would cause spinning difficulties. The only solution available now is either to lower the concentration of the cellulose in solution or increase the spinning temperature. By lowing the concentration of the cellulose not only slows down the production rate, but also requires more solvent volume that results in increasing of the manufacturing cost. High spinning temperature would easily result in largely reducing the cellulose polymerization degree that would reduce the strength of the final product. The above mentioned dilemmas of the cellulose solvent spin process is still the technicality that needs to be improved before the cellulose solvent spin process becomes a profitable process.

Furthermore, the dimethyl sulfoxide (DMSO) is one of the raw materials that has been studied in the laboratory for improving the viscose process, but because it is not easy to obtain the pure dimethyl sulfoxide and fails to achieve satisfactory effect, the dimethyl sulfoxide still can not meet the industry standard.

SUMMARY OF THE PRESENT INVENTION

The main objective of the present invention is to provide a cellulose solvent and the manufacturing process thereof, wherein the cellulose solvent is specifically adapted for producing a cellulose solution with low viscosity.

Another objective of the present invention is to provide a manufacturing process of cellulose solution by dissolving a cellulose into an organic cellulose solvent and water that can produce a cellulose solution with low viscosity.

Accordingly, the cellulose solvent is a solvent mixture produced by mixing a N-methylolcaprolactam as an additional solvent with a main solvent, N-methyl morpholine oxide, under a predetermined ratio. The cellulose solvent of the present invention not only can increase the swelling of the pulp before dissolving and lower the viscosity of the dope after dissolving, but also can improve the dissolving and spinning ability of the cellulose.

According to the present invention, the manufacturing process of cellulose solution with low viscosity includes the step of:

(a) adding a predetermined amount of pulp cellulose and polymerization anti-decay additive into a mixing chamber;

(b) fully mixing a predetermined proportion of a N-methyl morpholine oxide and a N-methylolcaprolactam to form a cellulose solvent;

(c) evenly mixing a predetermined amount of the cellulose solvent, a predetermined amount of water, the pulp, and the additive in the mixing chamber to form a cellulose slurry, wherein pulp fibers of the pulp are fully swelled; and (d) removing the water in the cellulose slurry by means of a film type evaporator, so that a cellulose solution with low viscosity is obtained.

DETAILED DESCRIPTION OF THE PREFERRED EMBODIMENT

Figure 1:
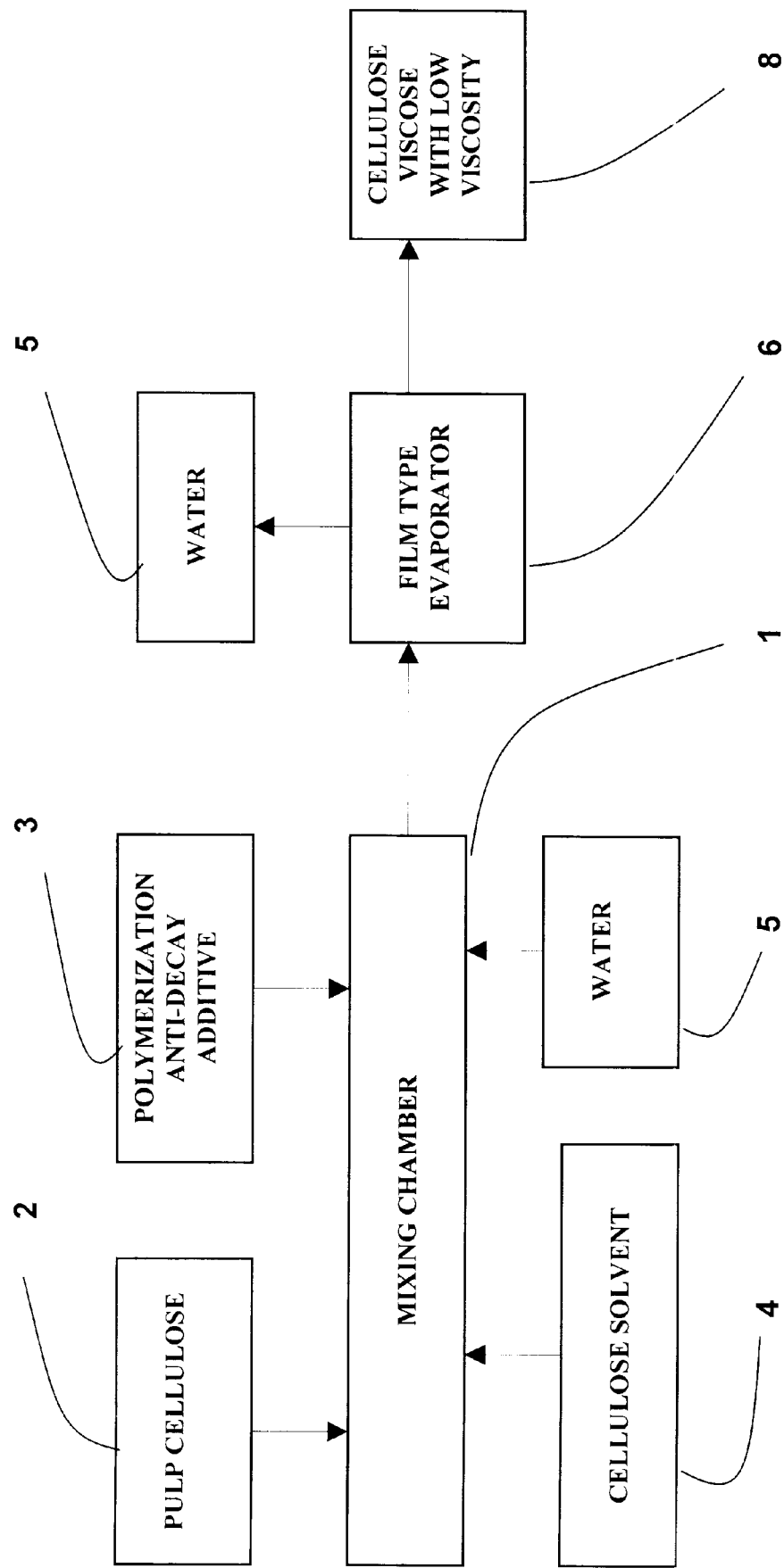
FIG. 1 illustrates a flowchart of a manufacturing process of a cellulose solution with low viscosity in accordance with a preferred embodiment of the present invention.

To mix an additional solvent with a commonly used main solvent can obtain a mixture of cellulose solvent that not only increases the swelling of the fibers during the dissolving process of the cellulose, but also enables the solvent process to proceed under a lower dissolving temperature and in high spin speed. In other words, the present invention effectively resolves the polymerization decay problem of the cellulose during the conventional cellulose solvent spin process, so that the physical property and quality of the final fiber product are greatly enhanced.

According to the present invention, the N-methyl morpholine oxide is a well-known solvent used in the conventional solvent process, but the N-methylolcaprolactam is a novel solvent that has a very inexpensive cost. The manufacturing process of the N-methylolcaprolactam for the present invention comprises the steps of:

A: dissolving 113 g of a caprolactam and 32.6 g of a 92% formaldehyde by heating in a reactor of a jacking at a temperature of 70° C. to form a reacting mixture;

B: adjusting a pH value of the reacting mixture to 11.0 by means of 0.1N of sodium hydroxide (NaOH);

C: completely sealing the reactor by a carbon dioxide $CO_2$ at a constant temperature of 70+/−5° C. for 6 hours for reaction;

D: after the reaction, removing the reacting mixture out of the reactor and cooling down the reacting mixture to room temperature; and E: adding 1 g of nucleue to the reacting mixture and allowing to react for 24 hours, and then 140 g of a white crystal of the N-methylolcaprolactam is prepared.

The chemical structure of the N-methylolcaprolactam is shown as follow:

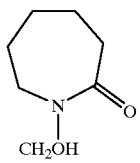

The present invention is focused on lowering the viscosity of the cellulose viscose. Referring to FIG. 1, a manufacturing process of cellulose solution with low viscosity of the present invention comprises the following steps:

(a) Add a predetermined amount of cellulose such as pulp cellulose 2 and polymerization anti-decay additive 3 into a mixing chamber 1, wherein 5000 PPM of the polymerization anti-decay additive 3 (depending on the amount of pulp cellulose 2 added) is added to the mixing chamber 1.

(b) Fully mix a main solvent, N-methyl morpholine oxide, with an additional solvent, N-methylolcaprolactam in a predetermined weight proportion to produce a cellulose solvent 4.

This mixing step is the most important criteria of the present invention. According to the present preferred embodiment, the predetermined weight proportion of the N-methyl morpholine oxide and the N-methylolcaprolactam is about 7:3. In other words, the cellulose solvent (4) is a mixture solvent of the N-methyl morpholine oxide (70% of the total weight +/−10%) and the N-methylolcaprolactam (30% of the total weight +/−10%).

(c) Evenly mix a predetermined amount of the cellulose solvent 4, a predetermined amount of water 5, the pulp cellulose 2, and the additive 3 in the mixing chamber 1 to form a cellulose slurry, wherein pulp fibers of the pulp cellulose are fully swelled.

According to the present preferred embodiment, 46% by weight of the cellulose solvent 4, 46% by weight of the water 5, and 8% by weight of the pulp cellulose 2 are injected into the mixing chamber 1 with the polymerization anti-decay additive 3. The mixing temperature inside the mixing chamber 1 is preferably kept at 60° C. The cellulose solvent 4, the water 5, the pulp cellulose 2, and the polymerization anti-decay additive 3 are evenly mixed in the mixing chamber 1 for 30 minutes until the pulp cellulose 2 is adequately swelled.

(d) The cellulose slurry is sent to a film type evaporator 6 to evaporate the water 5 in the cellulose slurry. When a predetermined amount of the water is removed from the cellulose slurry, a cellulose solution 8 with low viscosity is obtained.

According to the preferred embodiment of the present invention, the cellulose slurry is heated at 90° C. in the film type evaporator 5 under a reduced atmosphere pressure, between 50–100 mmHg, condition for about 5 minutes. Once the water 5 of crude pulp solution is removed from 46% to 10%, the process is completed and the final product of cellulose solution having a low viscosity is produced.

According to the above described manufacturing process, referring to the following tables 1 to 3, the present invention can achieve the following unexpected results:

1) High swelling ability: The present invention has a shorter swelling time for the pulp cellulose in comparison to using single solvent alone, moreover fewer and smaller mixing chambers are required for reaction, so that the manufacturing cost is reduced but the dissolving ability is enhanced.

TABLE 1

| Solvent Type | Cellulose Type | Swelling Condition (pH 10.5) | Swelling Ability (Before/After) | Swelling Ratio |
|---|---|---|---|---|
| Only N-methyl Morpholine Oxide | Soft Wood Pulp | 80° C. * 0.5 Hr | 10–24/20–40 μm | 1.7 |
| Only N-methyl Morpholine Oxide | Hard Wood Pulp | 80° C. * 0.5 Hr | 11–25/20–45 μm | 1.8 |
| Present Invention Mixed solvent | Soft Wood Pulp | 80° C. * 0.5 Hr | 10–24/20–45 μm | 2.0 |
| Present Invention Mixed solvent | Hard Wood Pulp | 80° C. * 0.5 Hr | 11–25/20–50 μm | 2.1 |

2) Low viscosity solution: The present invention takes use of the cellulose solvent mixture to manufacture the cellulose solution with relatively low viscosity, generally between 6000 poise to 12000 poise. Under the same condition, the viscosity of the cellulose solution produced by the present invention is much lower than that of the conventional manufacturing process which generally uses only one solvent. Therefore, the spinning temperature can be reduce to as low as between 5° C. to 10° C.; the polymerization decay rate of the cellulose can be reduced by 30%; the solvent cracking can be reduced to increase the recycle percentage of the cellulose solvent by 3–8%.

TABLE 2

| Solvent Type | Degree of Cellulose Polymerization | Cellulose Concentration | Dissolving Temperature | Dissolving Viscosity |
|---|---|---|---|---|
| Only N-methyl Morpholine Oxide | 1050 | 12% | 98° C. | 19000 Poise |
| Present Invention Solvent Mixture | 1050 | 12% | 98° C. | 11000 Poise |

3) Lower Solvent cost: The additional solvent, N-methylolcaprolactam used in the present invention can be produced by the simple manufacturing process disclosed above. It is apparent that the cost of the N-methylolcaprolactam composition is relatively low in comparison to the main solvent, N-methyl morpholine oxide. According to the present invention, the cellulose solvent may contains up to 20–40% of the additional solvent, and thus the manufacturing cost of the cellulose solution can be greatly reduced.

The following Table 3 illustrates a solvent cost comparison chart.

TABLE 3

| | | Conventional Method | | Present Invention | |
|---|---|---|---|---|---|
| Solvent Name | Unit Price | Mixing Ratio | Cost | Mixing Ratio | Cost |
| N-methyl Morpholine Oxide | USD$9/kg | 100% | USD$9/kg | 70% | USD$6/kg |
| N-methylol Caprolactom | USD$3/kg | — | — | 30% | USD$1/kg |
| Total | | | USD$9/kg | | USD$7/kg |

4) Higher Final product strength: The present invention successfully reduces the viscosity of the cellulose solution, which enhances the flowability and extensibility of the dope and also increases the spinning speed of up to 1000 M/min., that is much higher in comparison to the 100 M/min. of the viscose process or to 400 M/min. of the conventional solvent process. The present invention can enhance the production rate because the final product can be produced by high spinning speed. Moreover, the strength of the final product is improved to higher level.

What is claimed is:

1. A manufacturing process of cellulose solution with low viscosity, comprising the steps of:
   (a) adding a predetermined amount of a cellulose and polymerization anti-decay additive into a mixing chamber;
   (b) fully mixing a main solvent, N-methyl morpholine oxide, with an additional solvent, N-methylolcaprolactam, in a predetermined weight proportion to produce a cellulose solvent;
   (c) evenly mixing a predetermined amount of said cellulose solvent, a predetermined amount of water, said cellulose, and said polymerization anti-decay additive in said mixing chamber to form a cellulose slurry, wherein pulp fibers of said pulp cellulose are fully swelled; and
   (d) evaporating said water in said cellulose slurry by a film type evaporator, wherein when a predetermined amount of said water is removed from said cellulose slurry, a cellulose solution with low viscosity is produced.

2. A manufacturing process of cellulose solution with low viscosity, as recited in claim 1, wherein, in said step (a), said cellulose is pulp cellulose.

3. A manufacturing process of cellulose solution with low viscosity, as recited in claim 2, wherein, in said step (a), 5000 PPM of said polymerization anti-decay additive is added to said mixing chamber.

4. A manufacturing process of cellulose solution with low viscosity, as recited in claim 1, wherein, in said step (b), said predetermined weight proportion of said N-methyl morpholine oxide and said N-methylolcaprolactam is about 7:3.

5. A manufacturing process of cellulose solution with low viscosity, as recited in claim 3, wherein, in said step (b), said predetermined weight proportion of said N-methyl morpholine oxide and said N-methylolcaprolactam is about 7:3.

6. A manufacturing process of cellulose solution with low viscosity, as recited in claim 1, wherein, in said step (c), 46% by weight of said cellulose solvent, 46% by weight of said water, and 8% by weight of said cellulose are injected into said mixing chamber with said polymerization anti-decay additive.

7. A manufacturing process of cellulose solution with low viscosity, as recited in claim 5, wherein, in said step (c), 46% by weight of said cellulose solvent, 46% by weight of said water, and 8% by weight of said pulp cellulose are injected into said mixing chamber with said polymerization anti-decay additive.

8. A manufacturing process of cellulose solution with low viscosity, as recited in claim 1, wherein, in said step (c), a mixing temperature inside said mixing chamber is kept at 60° C., and that said cellulose solvent, said water, said cellulose, and said polymerization anti-decay additive are evenly mixed in said mixing chamber for 30 minutes until said cellulose is adequately swelled.

9. A manufacturing process of cellulose solution with low viscosity, as recited in claim 7, wherein, in said step (c), a mixing temperature inside said mixing chamber is kept at 60° C., and that said cellulose solvent, said water, said cellulose, and said polymerization anti-decay additive are evenly mixed in said mixing chamber for 30 minutes until said pulp cellulose is adequately swelled.

10. A manufacturing process of cellulose solution with low viscosity, as recited in claim 1, wherein, in said step (d), said cellulose solution is heated at 90° C. in said film type evaporator under a reduced atmosphere pressure condition, between 50–100 mmHg, for about 5 minutes until said water of cellulose solution is removed from 46% to 10%.

11. A manufacturing process of cellulose solution with low viscosity, as recited in claim 9, wherein, in said step (d), said cellulose solution is heated at 90° C. in said film type evaporator under a reduced atmosphere pressure condition, between 50–100 mmHg, for about 5 minutes until said water of cellulose solution is removed from 46% to 10%.

12. A cellulose solvent for producing a cellulose solution with low viscosity, comprising a 70% +/−10% by weight of N-methyl morpholine oxide fully mixed with a 30% +/−10% by weight of N-methylolcaprolactam.

* * * * *